Nov. 16, 1937.   H. W. STEVENSON   2,099,283
TRACTION SPREADER
Filed Dec. 22, 1936   2 Sheets-Sheet 2
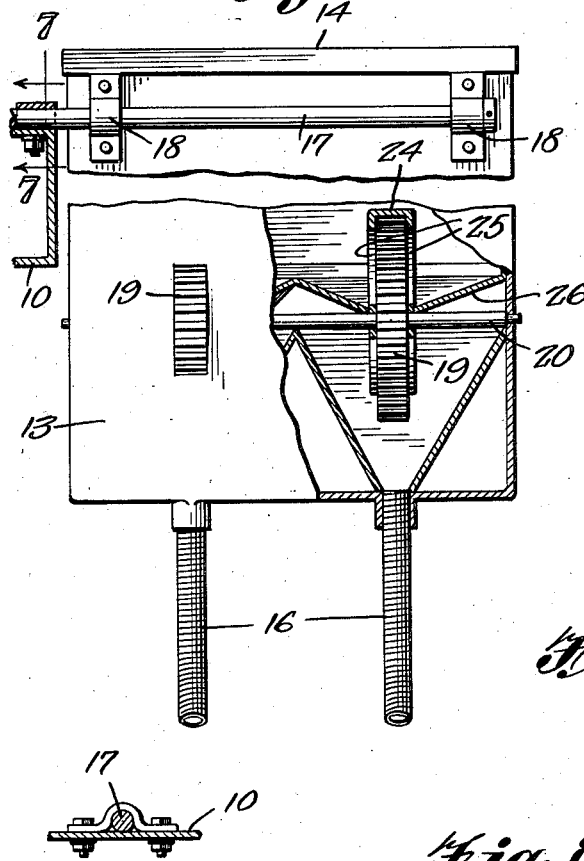
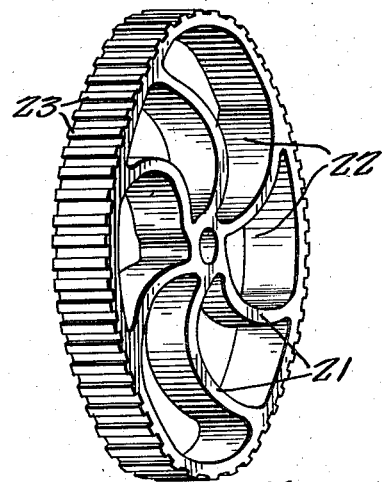
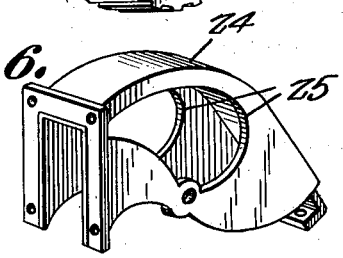
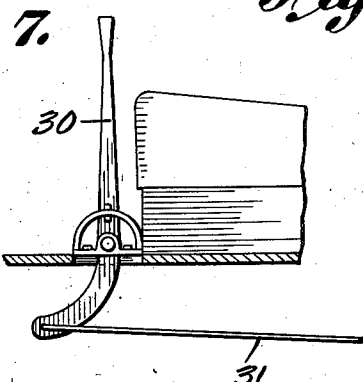
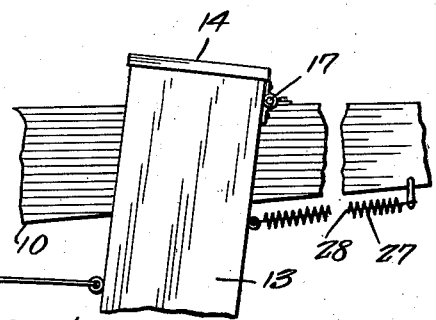
Hale W. Stevenson, INVENTOR
BY Victor J. Evans & Co.
ATTORNEYS Patented Nov. 16, 1937

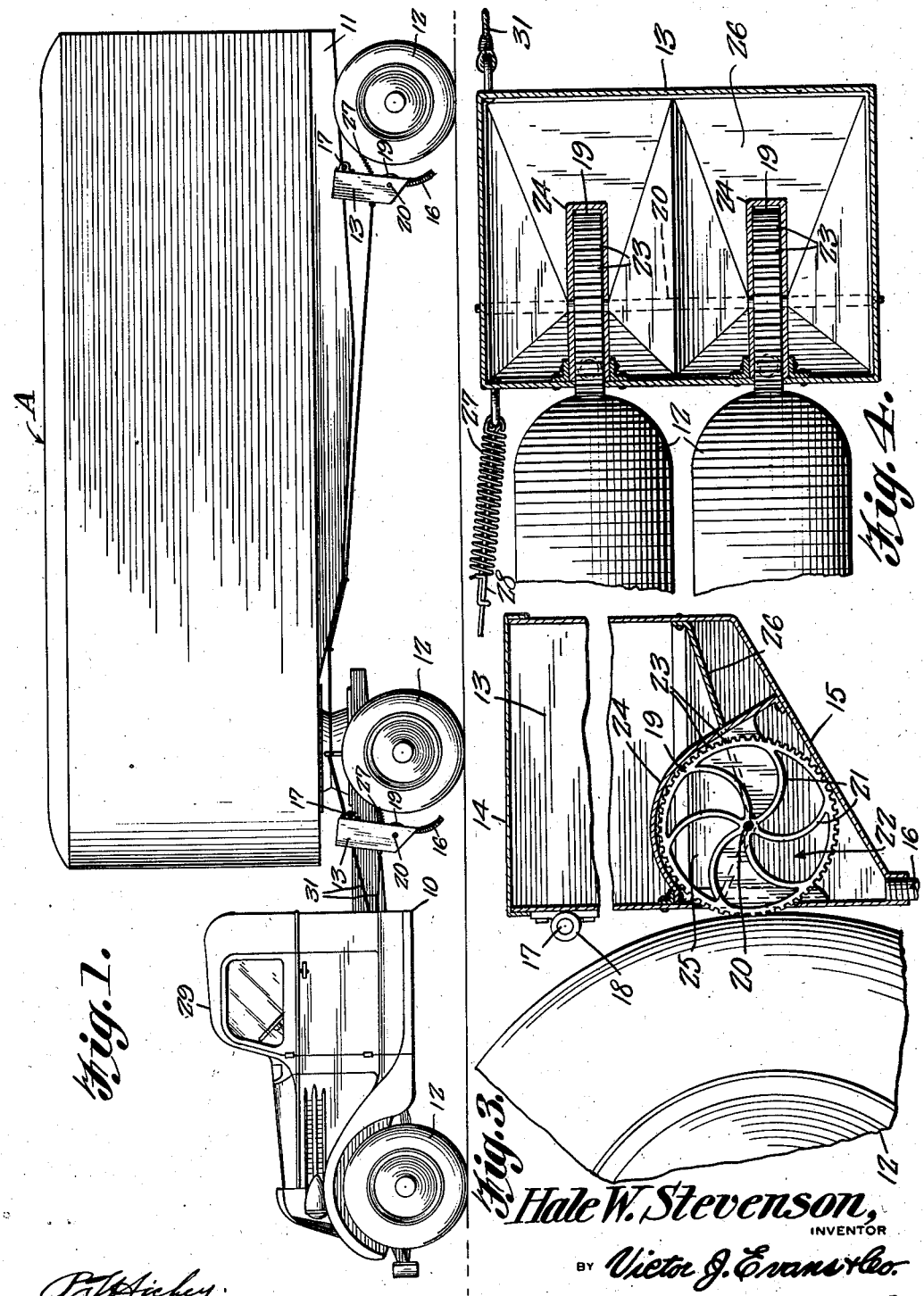

2,099,283

UNITED STATES PATENT OFFICE 2,099,283

TRACTION SPREADER

Hale W. Stevenson, Des Moines, Iowa

Application December 22, 1936, Serial No. 117,224

5 Claims. (Cl. 291—22)

The invention relates to a traction spreader and more especially to a vehicle attachment for delivering sand or other loose material upon a road surface for traction purposes.

The primary object of the invention is the provision of an attachment of this character, wherein dry material in loose form such as sand or the like can be delivered uniformly in determined amounts per foot of roadway thereon as traveled by a vehicle so as to prevent skidding, with the result that better traction may be had and assuring safe travel of the vehicle when upon icy roads or roads made slick with packed snow.

Another object of the invention is the provision of an attachment of this character, wherein the same is under the control of an operator and is rendered active through the wheels of a vehicle so as to spread material uniformly upon the road bed for the positive traction of the vehicle when upon slippery roads covered by snow, rain or ice.

A further object of the invention is the provision of an attachment of this character, wherein the feed of the material for the delivery thereof to a road bed will be had in a novel manner to prevent the skidding of the vehicle and also assuring positive traction thereof upon a road surface.

A still further object of the invention is the provision of an attachment of this character, which is simple in construction, thoroughly reliable and effective in operation, susceptible of easy attachment to a vehicle, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side elevation of a motor vehicle of the van type showing the attachment constructed in accordance with the invention applied thereto.

Figure 2 is an enlarged elevation of the attachment looking toward the front thereof and being partly broken away.

Figure 3 is a fragmentary vertical sectional view through the attachment showing the same in working position to a wheel of the vehicle.

Figure 4 is a horizontal sectional view thereof.

Figure 5 is a perspective view of the feed wheel of the attachment.

Figure 6 is a perspective view of a covering cap for said wheel.

Figure 7 is a sectional view on the line 7—7 of Figure 2 looking in the direction of the arrows.

Figure 8 is a mutilated side elevation partly in section showing in detail the control of the attachment.

Similar reference characters indicate corresponding parts throughout the several views in the drawings.

Referring to the drawings in detail, A designates generally a motor vehicle of the van type, in this instance involving as usual the forward truck 10 and the rear van trailing truck 11, respectively, provided with the usual traction wheels 12 of the pneumatic or solid tired type.

The traction spreader is adaptable to a front draft truck and in association with each of the wheels 12 excepting the front or foremost wheels of the lead draft truck is the attachment constituting the present invention which comprises a box-like receptacle 13 closed at its open top with a cover 14 which when engaged with said receptacle excludes moisture therefrom while the bottom 15 of this receptacle is inclined to effect a feeding hopper at the lower end of said receptacle.

Depending from the receptacle 13 in this instance is a pair of delivery tubes or spouts 16 for the double discharge of loose material contained within the receptacle onto a road bed in advance of and next to a wheel 12 for assuring positive traction of said wheel when traveling upon such road bed.

Arranged horizontally on each truck 10 and 11 is a hanger shaft 17 which protrudes the required distance beyond the side of the truck next thereto while fixed to the upper portion of the body of the receptacle 13 at one side thereof are bearings 18 loosely fitting the shaft 17 so that the receptacle can swing on the axis constituted by the said shaft. In this manner the receptacle 13 is swingingly supported in advance of the wheel 12 next thereto and thus be disposed in working relation to the same.

Located in the hopper portion of the receptacle 13 is one or several rotatable wheels 19 supported by an axle 20 suitably journaled transversely in a horizontal position within the said receptacle. The wheel is formed with spokes 21 extending from the hub to the outer rim of the same and therebetween are pockets or feed spaces 22 while the outer periphery of the rim of this wheel 19 is roughened, as, for example, by the formation of spaced teeth or ribs 23. The pockets open through opposite sides of the wheel. When the wheel 19 at its roughened outer periphery of the rim thereof is engaged with the wheel 12 next thereto it will be driven thereby.

Crowning the wheel 19 at an uppermost portion thereof is a cap or hood 24 having side windows or openings 25 so that material within the receptacle 13 will be admitted into the pockets 22. Provided in each receptacle 13 is a partition 26 dividing the said receptacle into upper and lower spaces, the upper space being for the storage of the material to be let into the pockets 22 of the wheel 19 and communication between these upper and lower spaces will only be had through the pockets 22. The hood or cap 24 is built on and rises from the partition 26 into the upper space within the receptacle and the sides of this hood or cap are so constructed that they cover the entire area of the pockets 22 at opposite sides of the wheel 19 so that the spokes 21 and the said sides of the cap or hood 24 together form a complete shutoff that at no time is there a direct channel for the material to flow from the upper space into the lower space and drop within the tube or spout 16. The flow of the material in the upper space within the receptacle 13 occurs through the openings 25 in the sides of the cap or hood 24 into the pockets 22, these measuring or regulating the amount of material which is carried from the upper space to the lower space in the receptacle and thence to the tube or spout. The wheel 19 operates as a measurer and conveyor for the material within the receptacle 13 and it logically follows that regardless of the speed of the vehicle the attachment will always spread a determined amount of traction material per foot of the road bed thereon.

The cap or hood 24 crowning the upper portion of each wheel 19 by the openings or windows 25 in the sides of said cap or hood allows material within the receptacle 13 to flow into the pockets 22 and thus be fed therefrom into the hopper portion on the rotation of the wheel for delivery or discharge from the said receptacle through the spouts or tubes 16 onto a road bed traveled by the vehicle for preventing skidding of such vehicle should the road bed surface be slippery resultant from rain, snow or ice thereon.

Each receptacle 13 has connected thereto a coiled retractile spring 27 which is also connected to an adjacent truck of the vehicle. This spring 27 is limited in its expansion by a cable or cord 28 trained therethrough and fixed at the points of attachment of the said spring 27. The purpose of the spring 27 is to urge the wheel 19 in contact with a vehicle wheel adjacent thereto so that the said wheel 19 will be driven therefrom for the operation of the attachment in delivering material from the receptacle 13 onto a road bed.

Within a cab 29 carried by the forward truck 10 of the vehicle is an actuating lever 30 which has linkage 31 with each receptacle 13 and such lever when shifted in one direction moves each receptacle to relieve contact of the wheel 19 with an adjacent wheel of the vehicle and on the shifting of such lever in an opposite direction the spring 27 under retraction thereof will bring the wheel 19 into contact with the vehicle wheel and in this position the attachment is operating for the spreading of sand or other loose material upon a road bed in advance of the vehicle wheel from within the receptacle 13 next thereto and in this manner affording better traction and eliminating the skidding of the said vehicle when traveling upon the road bed.

The construction of the receptacle 13 is such to exclude moisture from within the same so that the loose material therein will be maintained dry to avoid lumping of the material and also retarding discharge from such receptacle.

It is, of course, understood that the invention before described is not limited to the hand lever method of control in that the attachment may be otherwise controlled and this is contemplated within the scope of the said invention.

What is claimed is:

1. The combination of a receptacle having a discharge, means for swingingly supporting the receptacle forwardly of and in close relation to a vehicle wheel, and means partially within the receptacle and engageable with the vehicle wheel for feeding material from said receptacle through said discharge onto a road bed and having measuring spaces regulating the quantity of material discharged.

2. The combination of a receptacle having a discharge, means for swingingly supporting the receptacle forwardly of and in close relation to a vehicle wheel, means partially within the receptacle and engageable with the vehicle wheel for feeding material from said receptacle through said discharge onto a road bed and having measuring spaces regulating the quantity of material discharged, and means active upon the receptacle to urge the same in a direction for the engagement of the feed means with the vehicle wheel.

3. The combination of a receptacle having a discharge, means for swingingly supporting the receptacle forwardly of and in close relation to a vehicle wheel, means partially within the receptacle and engageable with the vehicle wheel for feeding material from said receptacle through said discharge onto a road bed and having measuring spaces regulating the quantity of material discharged, means active upon the receptacle to urge the same in a direction for the engagement of the feed means with the vehicle wheel, and manually operated means for relieving engagement of the feed means with the vehicle wheel.

4. The combination of a receptacle having a discharge, means for swingingly supporting the receptacle in advance of and in close relation to a vehicle wheel, and means partially within the receptacle and engageable with the vehicle wheel for uniformly feeding determined amounts of material per foot of roadway from said receptacle through said discharge onto the roadway bed for positive traction of the vehicle wheel thereon.

5. A traction spreader for attachment to a wheeled vehicle comprising a box-like receptacle having an inclined bottom, a delivery spout depending from said bottom, a pivotal mounting for said box-like receptacle and swingingly connecting the same to the vehicle adjacent to a wheel with the delivery spout in lowermost position, a spoked wheel partially within the said receptacle and adapted for contact with the first-mentioned wheel, a partition arranged horizontally within the receptacle for dividing the same into upper and lower spaces, a hood associated with said partition and rising within the upper space for covering the upper portion of the spoked wheel and having side windows forming communications between the spokes of the last-mentioned wheel and the said upper space within the receptacle whereby the said spoked wheel will measure and deliver determined quantities of material within the receptacle from the upper space to the lower space therein on the rotation of the spoked wheel when contacting with the first-mentioned wheel, means active upon the receptacle to urge the same in a direction for engagement of the first- and second-mentioned wheels with each other, and manually operated means for relieving the engagement of the first- and second-named wheels with each other.

HALE W. STEVENSON.